Patented July 22, 1941

2,250,213

UNITED STATES PATENT OFFICE 2,250,213

SYNTHETIC ORE FOR BLAST FURNACES

Charles E. Agnew, West Norriton Township, Montgomery County, Pa.

No Drawing. Application July 11, 1940, Serial No. 344,943

15 Claims. (Cl. 75—28)

This invention relates generally to a synthetic self-fluxing ore and more particularly to such material which is suitable for use in blast furnaces. The invention utilizes the values in open hearth slag in producing the synthetic ore which may be then charged into an iron blast furnace along with iron ore and the usual remaining charge in order to produce pig iron. Similarly, the synthetic ore may be used as a part of the blast furnace charge in the production of ferro-manganese.

It is now known to utilize the values in open hearth slags in the production of pig iron in a blast furnace by charging a portion of open hearth slag into the blast furnace, then carrying out the reduction of the iron ore in the usual manner. This method, although valuable, has certain disadvantages. Open hearth slag, either that resulting from the acid or basic processes, has a high melting point, because of the fact that it is either strongly basic or strongly acidic, depending upon which process was used in the open hearth. The slag from a basic open hearth furnace usually contains about 50% of lime plus magnesia and only about 15% of silica. This strong basicity of such slag gives it a rather high melting point. Similarly, the high acidity of slag resulting from the acid open hearth process gives it a high melting point. Furthermore, open hearth slags, either acid or basic, when allowed to cool naturally, as when run into a slag dump, are of hard rock-like character and are very dense. Because of the high melting point and high density of open hearth slag, a relatively large amount of fuel is required in the blast furnace where it is used as a part of the charge.

In spite of the above referred to difficulties encountered in the use of open hearth slag as blast furnace material, the slag does contain values which it is desirable to utilize. Basic open hearth slag contains about 50% CaO plus MgO, about 15% iron and about 6% manganese. The use of this slag in a blast furnace charge reduces the amount of limestone usually required in such charges and also reduces the amount of manganese bearing ore required to be added to the charge. Most of the ores of the United States are deficient in manganese and it is, therefore, desirable to utilize the manganese values of open hearth slags.

I have found that the values such as lime, manganese and iron in open hearth slag may be utilized by mixing the open hearth slag with iron bearing material, melting the mixture into a homogeneous mass and then treating the molten mass to produce a cellular product. The product so produced has a lower melting point than the open hearth slag from which it was produced and furthermore is porous. Both these properties of my synthetic ore decrease the amount of fuel required in the blast furnace containing a charge including my synthetic ore as compared with a charge including an equal amount of open hearth slag. The iron bearing material used in producing my synthetic ore may be any one or more of a variety of materials and will be referred to later on more in detail but by way of example, I shall refer to the production of synthetic ore from a mixture of basic open hearth slag and pyrites cinder. Pyrites cinder is the residue resulting from roasting pyrites in order to lower or eliminate the sulphur content. A typical analysis of pyrites cinder is:

| | Per cent |
|---|---|
| Fe | 55.00 |
| Mn | .10 |
| P | .02 |
| $SiO_2$ | 5.00 |
| $Al_2O_3$ | 1.50 |
| CaO | Trace |
| Pb | .85 |

A typical analysis of basic open hearth slag is:

| | Per cent |
|---|---|
| Fe | 15.00 |
| Mn | 6.00 |
| P | 1.00 |
| $SiO_2$ | 15.00 |
| $Al_2O_3$ | 4.00 |
| Bases (CaO+MgO) | 48.00 |
| Pb | None |

In the preferred process, a mixture of about 50% by weight of basic open hearth slag and 50% of pyrites cinder is charged into an open hearth or other suitable furnace or heated vessel and the mixture is melted into a homogeneous mass. The melt is held until substantially all of the volatile matter including lead, zinc and arsenic is volatilized and thereafter the molten mass is treated with water to produce cellular granulate. A stream of water may be forced against a stream of molten material coming from the furnace so as to granulate the molten material and by controlling the ratio of water to molten material the porosity or cellular character of the granulate may be controlled. Instead of using a stream of water to treat the molten mass, I may use a jet of steam or air or other cooling fluid, provided the jet is of sufficient volume and pressure to permeate and cool the molten mass. In place of using a stream or jet of cooling fluid, the molten mass may be poured into a body of water or other cooling liquid which results in a fine granulate. A larger granulate or other porous product may be produced by using a jet or stream of cooling fluid and controlling the volume and pressure of the fluid in accordance with the size and character of the product desired.

If the mixture which is to be melted contains 50% of basic open hearth slag and 50% of pyrites cinder, the analysis of the cellular product will be about:

|  | Per cent |
|---|---|
| Fe | 35.00 |
| Mn | 3.05 |
| P | .510 |
| $SiO_2$ | 10.00 |
| $Al_2O_3$ | 2.75 |
| Bases (CaO+MgO) | 24.00 |
| Pb | None |

This will be readily seen from the following table:

Table

|  | Fe | Mn | P | $SiO_2$ | $Al_2O_3$ | CaO+MgO | Pb |
|---|---|---|---|---|---|---|---|
| 50% pyrites cinder | 55.00 | 0.10 | .02 | 5.0 | 1.50 | Trace | .85 |
| 50% basic open hearth slag | 15.00 | 6.00 | 1.00 | 15.0 | 4.0 | 48.00 | .00 |
| Average | 35.00 | 3.05 | .51 | 10.0 | 2.75 | 24.00 | .00 |

The homogeneous product resulting from melting the mixture of basic open hearth slag and pyrites cinder given in the table has a lower melting point than either the open hearth slag or the pyrites cinder. It will be noted that the basic open hearth slag is strongly basic in character and that the pyrites cinder is strongly acidic in character. This means that each of these materials has a higher melting point than the more nearly neutral product resulting from melting the mixture of the two. Thus when using basic open hearth slag it is desirable to mix with it a material which is more acidic in character than is the basic open hearth slag.

The proportions of basic open hearth slag and pyrites cinder or other iron bearing material which may be substituted therefor may be varied within fairly wide limits, although the preferred amount of slag is about 50% by weight of the mixture. The mixture which is to be melted may, however, contain as low as about 35% or as high as 65% by weight of the open hearth slag.

After the mixture is melted, it is held in a molten state until all volatile matter either gaseous or metallic has passed off by being evolved into the atmosphere. Pyrites cinder usually contains small percentages of certain metals such as lead, zinc and arsenic, which are very objectionable in blast furnace operation even in very small quantities because they accumulate in the furnace. In my process, these objectionable volatile metals are entirely eliminated, although under the conditions existing in an iron blast furnace they are not eliminated. Zinc will condense on the furnace walls in the lower regions of the furnace and may cause such swelling of the wall as to crack the furnace shell. Lead will impregnate and disintegrate the brick of the furnace walls and has a cooling effect on the iron. Arsenic has a detrimental effect on the pig iron for steel making purposes.

Any suitable type of furnace may be used for melting the mixture of open hearth slag and iron bearing material. I may, for example, use an open hearth furnace, a heated ladle or a revolving ladle somewhat in the nature of a concrete mixer. The ladles, if used, should be provided with some means for heating them, such for example as a gas or oil burner. The open hearth slag which is to be mixed with the iron bearing material may be added to the furnace or other heating vessel, either in a solid unheated condition, solid heated condition or in molten condition. One suitable way of conserving heat is to add the iron bearing material to a revolving ladle and then introduce molten open hearth slag directly from the furnace into the ladle. A burner is provided for maintaining the mixture in molten condition and after the volatile matter including lead, zinc and arsenic is volatilized, the molten mass is discharged from the ladle in a stream and treated with a stream of water or other cooling fluid to produce the cellular granulate.

The invention has been described in connection with the use of basic open hearth slag. I may, however, use acid open hearth slag, provided some basic material, for example lime, is added thereto in amount sufficient to make the mixture basic. There is then added to this mixture some iron bearing material, for example pyrites cinder, and the mixture is melted and then converted into granular form as previously described.

In place of or in addition to the pyrites cinder, I may use any other suitable iron bearing material. Among such materials, the following may be mentioned:

*Roll scale.*

*Ore concentrates, similar to those usually sintered.*—These concentrates are of small particle size and if used directly as blast furnace material are not entirely suitable because they tend to pack together too closely, thereby preventing free circulation of the blast furnace gases in the blast furnace. Accordingy these concentrates are usually sintered before they are added to the blast furnace charge.

*Open hearth checker dust.*—The regenerative chambers of open hearth furnaces are constructed of checker brick and from time to time the checkers must be cleaned of the solids which have been carried along in the gas stream and deposited on this brickwork. These solids are called checker dust and frequently contain as much as 50% iron, the balance being silicious gangue.

*Blooming mill cinder.*—A conglomerate formed from the steel drippings of steel ingots and spalls of the brickwork of soaking pits. This material is high in iron content and contains a silicious gangue. As previously pointed out, it is desirable to use with the basic open hearth slag a silicious or other material of acidic character, in order to lower the melting point of the mixture and render it suitable when molten for conversion into granulate by treatment with water.

*Heating cinder.*—A product similar to blooming mill cinder and recovered from the reheating furnace of the various mills.

*Puddle cinder.*—This is the slag from a puddle furnace. It contains about 50% iron and has a silicious gangue.

*Bessemer spittings.*—The slag from a Bessemer steel converter. It contains iron, manganese and has a silicious gangue.

*Aniline sludge.*—A by-product of the aniline dye industry. It contains about 50% iron and has a silicious gangue.

*Hematite ore.*

*Manganese ore.*

The cellular product produced according to my process is an excellent material for charging in a blast furnace. It is of a porous or cellular character, due to the treatment with water or other cooling fluid, and this porosity may be varied according to the amount of cooling fluid which is used in the process. It contains the iron, manganese, lime and magnesia contents of the open hearth slag which otherwise would be wasted. It has a lower melting point than either the open hearth slag or the iron bearing material from which it is made. In addition, its cellular character aids in easy melting, due to the large amount of contact of the blast furnace gases with the cellular granulate. The objectionable volatile metals such as lead, zinc and arsenic are eliminated because the mixture is melted into a homogeneous mass and is held for such time as to complete the reactions between the ingredients and to volatilize these objectionable metals. The chemical character of the molten mass from which the porous product is made may be accurately controlled by varying the proportions of the constituents of the mixture so as to produce the most desirable composition of the granulate. Likewise the physical character of the granulate may be varied by regulating the proportion of water or other cooling fluid which is used in treating the molten mass.

The invention is not limited to the preferred procedure or proportions which have been given merely for illustrative purposes but may be embodied or practiced within the scope of the following claims.

I claim:

1. The process of producing synthetic ore suitable for use in a blast furnace, which comprises melting a mixture of open hearth slag and iron bearing material, holding the melt for a time sufficient to dissolve the iron bearing material and produce a homogeneous molten mass, and treating the molten mass with cooling fluid to produce a cellular product.

2. The process of producing synthetic ore suitable for use in a blast furnace, which comprises melting a mixture of basic open hearth slag and iron bearing material, holding the melt for a time sufficient to dissolve the iron bearing material and produce a homogeneous molten mass, and treating the molten mass with cooling fluid to produce a cellular product.

3. The process of producing synthetic ore suitable for use in a blast furnace, which comprises melting a mixture of basic open hearth slag and roll scale, holding the melt for a time sufficient to dissolve the roll scale and produce a homogeneous molten mass, and treating the molten mass with cooling fluid to produce a cellular product.

4. The process of producing synthetic ore suitable for use in a blast furnace, which comprises melting a mixture of basic open hearth slag and ore concentrate, holding the melt for a time sufficient to dissolve the ore concentrate and produce a homogeneous molten mass, and treating the molten mass with cooling fluid to produce a cellular product.

5. The process of producing synthetic ore suitable for use in a blast furnace, which comprises melting a mixture of basic open hearth slag and pyrites cinder, holding the melt for a time sufficient to dissolve the pyrites cinder and produce a homogeneous molten mass, and treating the molten mass with cooling fluid to produce a cellular product.

6. The process of producing synthetic ore suitable for use in a blast furnace, which comprises melting a mixture of basic open hearth slag and iron bearing material into a homogeneous mass and holding the melt until substantially all volatile matter including lead, zinc and arsenic is volatilized, and treating the molten mass with cooling fluid to produce a cellular product.

7. The process of producing synthetic ore suitable for use in a blast furnace, which comprises melting a mixture of basic open hearth slag and iron bearing material which is more acidic than the open hearth slag, holding the melt for a time sufficient to dissolve the iron bearing material and produce a homogeneous molten mass, and treating the molten mass with cooling fluid to produce a cellular product.

8. The process of producing synthetic ore suitable for use in a blast furnace, which comprises melting a mixture of basic open hearth slag and iron bearing material which is more acidic than the open hearth slag into a homogeneous mass, holding the melt until substantially all volatile matter including lead, zinc and arsenic is volatilized, and treating the molten mass with cooling fluid to produce a cellular product.

9. The process of producing synthetic ore suitable for use in a blast furnace, which comprises melting a mixture of basic open hearth slag and iron bearing material in which the basic open hearth slag constitutes about 35 to 65% by weight of the mixture, holding the melt for a time sufficient to dissolve the iron bearing material and produce a homogeneous molten mass, and treating the molten mass with cooling fluid to produce a cellular product.

10. The process of producing synthetic ore suitable for use in a blast furnace, which comprises melting a mixture of basic open hearth slag and iron bearing material in which the basic open hearth slag constitutes about 50% by weight of the mixture, holding the melt for a time sufficient to dissolve the iron bearing material and produce a homogeneous molten mass, and treating the molten mass with cooling fluid to produce a cellular product.

11. The process of producing synthetic ore suitable for use in a blast furnace, which comprises melting a mixture of basic open hearth slag and iron bearing material in which the basic open hearth slag constitutes about 35 to 65% by weight of the mixture into a homogeneous mass, holding the melt until substantially all volatile matter including lead, zinc and arsenic is volatilized, and treating the molten mass with cooling fluid to produce a cellular product.

12. The process of producing synthetic ore suitable for use in a blast furnace, which comprises melting a mixture of basic open hearth slag and iron bearing material which is more acidic than the open hearth slag and in which the open hearth slag constitutes about 35 to 65% by weight of the mixture, holding the melt for a time sufficient to dissolve the iron bearing material and produce a homogeneous molten mass, and treating the molten mass with cooling fluid to produce a cellular product.

13. The process of producing synthetic ore suitable for use in a blast furnace, which comprises melting a mixture of basic open hearth slag and iron bearing material which is more acidic than the open hearth slag and in which the open hearth slag constitutes about 35 to 65% by weight of the mixture into a homogeneous mass, holding the melt until substantially all volatile matter including lead, zinc and arsenic is volatilized, and treating the molten mass with cooling fluid to produce a cellular product.

14. The process of producing synthetic ore suitable for use in a blast furnace, which comprises melting a mixture of acid open hearth slag, a sufficient quantity of basic material to make the mixture basic, and iron bearing material, holding the melt for a time sufficient to dissolve the iron bearing material and produce a homogeneous molten mass, and treating the molten mass with cooling fluid to produce a cellular product.

15. Synthetic ore suitable for use in a blast furnace, which comprises a cellular product homogeneous in composition, containing substantial amounts of manganese and iron, and resulting from melting a mixture of basic open hearth slag and iron bearing material into a homogeneous mass and treating the molten mass with cooling fluid.

CHARLES E. AGNEW.